(12) United States Patent
Capuozzo et al.

(10) Patent No.: US 8,667,152 B2
(45) Date of Patent: Mar. 4, 2014

(54) ENHANCED CONTENT SHARING FRAMEWORK

(75) Inventors: Giuseppe Capuozzo, Rome (IT); Marco Borghini, Rome (IT)

(73) Assignee: Accenture Global Services Limited, Dublin (IE)

( * ) Notice: Subject to any disclaimer, the term of this patent is extended or adjusted under 35 U.S.C. 154(b) by 705 days.

(21) Appl. No.: 12/428,605

(22) Filed: Apr. 23, 2009

(65) Prior Publication Data

US 2010/0161818 A1 Jun. 24, 2010

(30) Foreign Application Priority Data

Dec. 23, 2008 (EP) .................................. 08425815

(51) Int. Cl.
*G06F 15/16* (2006.01)
(52) U.S. Cl.
USPC ...................................................... 709/229
(58) Field of Classification Search
USPC ...................................................... 709/229
See application file for complete search history.

(56) References Cited

U.S. PATENT DOCUMENTS

| | | | |
|---|---|---|---|
| 2004/0117845 A1* | 6/2004 | Karaoguz et al. | 725/134 |
| 2005/0060411 A1* | 3/2005 | Coulombe et al. | 709/227 |
| 2006/0020960 A1* | 1/2006 | Relan et al. | 725/30 |
| 2008/0052406 A1* | 2/2008 | Kong et al. | 709/237 |
| 2008/0155615 A1* | 6/2008 | Craner et al. | 725/91 |
| 2008/0294791 A1* | 11/2008 | Karaoguz et al. | 709/231 |
| 2009/0259761 A1* | 10/2009 | Racabi | 709/231 |
| 2009/0300673 A1* | 12/2009 | Bachet et al. | 725/31 |
| 2010/0088292 A1* | 4/2010 | Tirpak et al. | 707/705 |
| 2010/0095332 A1* | 4/2010 | Gran et al. | 725/93 |
| 2010/0191829 A1* | 7/2010 | Cagenius | 709/219 |

FOREIGN PATENT DOCUMENTS

EP 1691525 8/2006

OTHER PUBLICATIONS

Extended European Search Report, Application No. 08425815.1-2221, dated May 26, 2009 (5 total pages).
EPO Office Action for Application No. 08425815.1-1958 dated Dec. 20, 2013, 5 pages.

* cited by examiner

*Primary Examiner* — Lynn Feild
*Assistant Examiner* — Lin Liu
(74) *Attorney, Agent, or Firm* — Fish & Richardson P.C.

(57) ABSTRACT

An enhanced content sharing framework, in which a presence table indexing content globally stored on a respective home network, and policy information identifying users who are authorized to access the respective home network are received from first and second home network manager devices that respectively manage first and second home networks that each comprises one or more content rendering devices and content storing devices. A message is received from a user requesting that particular content be provided from the first home network to a particular content rendering device or content storing device of the second home network. Based on the presence table of the first home network, it is determined that the particular content is stored on the first home network, and, based on the policy information of the first home network, it is determined that the user is authorized to access the particular content on the first home network.

28 Claims, 8 Drawing Sheets

ENHANCED CONTENT SHARING FRAMEWORK

CROSS-REFERENCE TO RELATED APPLICATIONS

This application claims priority to European Patent Application No. 08425815.1, filed Dec. 23, 2008, which is incorporated herein by reference.

FIELD

The present disclosure generally relates to content sharing.

BACKGROUND

The digital revolution has changed the way information is stored, accessed and used. Previously, information was restricted by its physical medium, such as a newspaper, book, a vinyl record, or a videotape or videocassette. Today's content, regardless of its nature, is expressed in streams of bits which can be stored everywhere, carried everywhere, and enjoyed everywhere. However, digitalization often causes content spreading, leading users to needlessly micro-manage where their content is stored, and to wonder in frustration how to easily access or share this content while avoiding misuse and maintaining data integrity.

SUMMARY

According to one general implementation, an enhanced content sharing framework includes communities of content rendering and storing devices that are each managed by home network manager devices. The home network manager devices provide information to a home network community server, this information including, for example, a listing of all content stored on the various content rendering and storing devices, and the users who are authorized to retrieve or store the content. The listing of content may or may not identify which content storing devices store each discrete item of content.

Using the enhanced framework, authorized users may, for example, instruct the home network community server to move content from one device in a first community to another device in a second community without necessarily specifying the content storing device from which the content is to be moved. By contacting and instructing the home network manager devices or the individual content rendering and storing devices, the home network community server takes the necessary steps to implement the user's desired action, without requiring the user to provide content addressing or location information, or detailed technical commands tailored to each appropriate device.

According to another general implementation, a computer-implemented process includes receiving, from first and second home network manager devices that respectively manage first and second home networks that each comprises one or more content rendering devices and content storing devices, a presence table indexing content globally stored on the respective home network, and policy information identifying users who are authorized to access the respective home network. The process also includes receiving a message from a user requesting that particular content be provided from the first home network to a particular content rendering device or content storing device of the second home network, determining, based on the presence table of the first home network, that the particular content is stored on the first home network, and determining, based on the policy information of the first home network, that the user is authorized to access the particular content on the first home network. The process also includes determining, based on the policy information of the second home network, that the user is authorized to access the particular content rendering device or content storing device of the second home network, and providing the particular content from the first home network to the particular content rendering device or content storing device of the second home network based on determining that the particular content is stored on the first home network, that the user is authorized to access the particular content, and that the user is authorized to access the particular content rendering device or content storing device of the second home network.

Implementations may include one or more of the following features. For example, the presence table may index the content without identifying the one or more content storing devices which store the content, and the message may request that the particular content be provided from the first home network without specifying the one or more content storing devices of the first home network from which to provide the particular content. The first and second home network manager devices may be implemented in a single home network manager device, and the first and second home networks may be a single home network. The one or more content rendering devices and content storing devices may further include a personal computer (PC), a telephone, a network-attached storage (NAS), a digital picture frame (DPF), a camera, a set-top box (STB), a digital versatile disc (DVD) recorder, an Internet protocol television (IPTV), and/or any other multimedia consumer electronic devices (e.g., through the use of protocol adaptors and/or any other connectivity mechanism or interface). For each of the first and second home networks, the presence table may further identify, and list capabilities of, the respective one or more content rendering devices and content storing devices, and the policy information may further list a level of authorization of the users who are authorized to access the respective home network.

The process may also include transcoding the particular content to match the listed capability of the particular content rendering device or content storing device, or receiving a query term from the user, performing, using the query term, both a local query of the presence table of the first home network using the query term, and an online query of an online database, and providing a search results page to the user, the search results page include a local results region identifying the content stored on the first home network which satisfies the query term, and an online results region identifying content stored in the online database which satisfies the query, and which is not stored on the first home network. The process may also include receiving user profile information from the first network manager device, where the online query of the online database is performed using the user profile information. The message may also be received over the Internet from a mobile device operated by the user, from outside of a physical proximity of the first home network. The particular content may be provided over the Internet to a mobile content rendering device or content storing device of the second home network, which is disposed outside of a physical proximity of the first home network.

The process may also include providing a list to the user identifying the one or more content rendering devices and content storing devices of the first home network that the user is authorized to access, and of the content globally stored on the first home network, where the list does not identify which of the one or more content storing devices of the first home network stores the content. The process may also include transmitting a discovery request from the first home network manager device, and receiving, from the one or more content rendering devices and content storing devices, and based on the discovery request, data identifying the content and identifying, and listing capabilities of, the one or more content rendering devices and content storage devices. Providing the particular content further comprises transcoding, then streaming the particular content to the particular content rendering device or content storing device of the second home network. The one or more content rendering devices and content storing devices may be implemented as a single device capable of both rendering and storing content.

The process may also include providing a list of home networks that the user is authorized to access, and providing a list of content stored on the home networks that the user is authorized to access, without identifying individual content rendering devices or content storing devices of the listed home networks. The process may further include transmitting a signal to the second home network manager device indicating that the particular content is to be provided, based on determining that the particular content is stored on the first home network, that the user is authorized to access the particular content, and that the user is authorized to access the particular content rendering device or content storing device of the second home network. The process may further include providing a notification to the user based on determining that the particular content is not stored on the first home network, that the user is not authorized to access the particular content, or that the user is not authorized to access the particular content rendering device or content storing device of the second home network. The message may be a Session Initiation Protocol (SIP) message.

According to another general implementation, a system includes one or more computers, and a computer-readable medium coupled to the one or more computers. The computer-readable medium has instructions stored thereon which, when executed by the one or more computers, cause the one or more computers to perform operations. The operations include receiving, from first and second home network manager devices that respectively manage first and second home networks that each comprises one or more content rendering devices and content storing devices, a presence table indexing content globally stored on the respective home network, and policy information identifying users who are authorized to access the respective home network. The operations also include receiving a message from a user requesting that particular content be provided from the first home network to a particular content rendering device or content storing device of the second home network, determining, based on the presence table of the first home network, that the particular content is stored on the first home network, and determining, based on the policy information of the first home network, that the user is authorized to access the particular content on the first home network. The operations further include determining, based on the policy information of the second home network, that the user is authorized to access the particular content rendering device or content storing device of the second home network, and providing the particular content from the first home network to the particular content rendering device or content storing device of the second home network based on determining that the particular content is stored on the first home network, that the user is authorized to access the particular content, and that the user is authorized to access the particular content rendering device or content storing device of the second home network.

Implementations may include one or more of the following features. The one or more computers may further include first and second home computer units each connected to a server. The first home computer unit may manage, the first home network that comprises one or more content rendering devices and content storing devices, receive a presence table indexing content globally stored on the first home network, and policy information identifying users who are authorized to access the first home network, receive a message from a user requesting that particular content be provided from the first home network to a particular content rendering device or content storing device of the second home network, determine, based on the presence table, that the particular content is stored on the first home network, determine, based on the policy information of the first home network, that the user is authorized to access the particular content on the first home network, and provide the particular content from the first home network to the second home network based on determining that the particular content is stored on the first home network, and that the user is authorized to access the particular content.

In additional examples, the second home computer unit may manage the second home network that comprises one or more content rendering devices and content storing devices, receive a presence table indexing content globally stored on the second home network, and policy information identifying users who are authorized to access the second home network, determine, based on the policy information, that the user is authorized to access the particular content rendering device or content storing device of the second home network, and receive the particular content from the first home network based on determining that the user is authorized to access the particular content rendering device or content storing device of the second home network.

According to another general implementation, a computer server is connectable to at least a first and second home network manager devices that respectively manage first and second home networks that each comprises one or more content rendering devices and content storing devices. The server is programmed for storing a presence table indexing content globally stored on the respective home network, and policy information identifying users who are authorized to access the respective home network, receiving a message from a user requesting that particular content be provided from the first home network to a particular content rendering device or content storing device of the second home network, determining, based on the presence table of the first home network, that the particular content is stored on the first home network, determining, based on the policy information of the first home network, that the user is authorized to access the particular content on the first home network, and determining, based on the policy information of the second home network, that the user is authorized to access the particular content rendering device or content storing device of the second home network.

Implementations may include one or more of the following features. For instance, the computer server may be programmed for providing the particular content from the first home network to the particular content rendering device or content storing device of the second home network based on determining that the particular content is stored on the first home network, that the user is authorized to access the particular content, and that the user is authorized to access the particular content rendering device or content storing device of the second home network.

According to a further general implementation, a computer-readable medium encoded with a computer program comprising instructions that, when executed, operate to cause a computer to perform operations. The operations include receiving, from first and second home network manager devices that respectively manage first and second home networks that each comprises one or more content rendering devices and content storing devices, a presence table indexing content globally stored on the respective home network, and policy information identifying users who are authorized to access the respective home network. The operations also include receiving a message from a user requesting that particular content be provided from the first home network to a particular content rendering device or content storing device of the second home network, determining, based on the presence table of the first home network, that the particular content is stored on the first home network, and determining, based on the policy information of the first home network, that the user is authorized to access the particular content on the first home network. The operations further include determining, based on the policy information of the second home network, that the user is authorized to access the particular content rendering device or content storing device of the second home network, and providing the particular content from the first home network to the particular content rendering device or content storing device of the second home network based on determining that the particular content is stored on the first home network, that the user is authorized to access the particular content, and that the user is authorized to access the particular content rendering device or content storing device of the second home network.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

In the various drawings, like reference numbers represent corresponding parts throughout.

DETAILED DESCRIPTION

Figure 1:
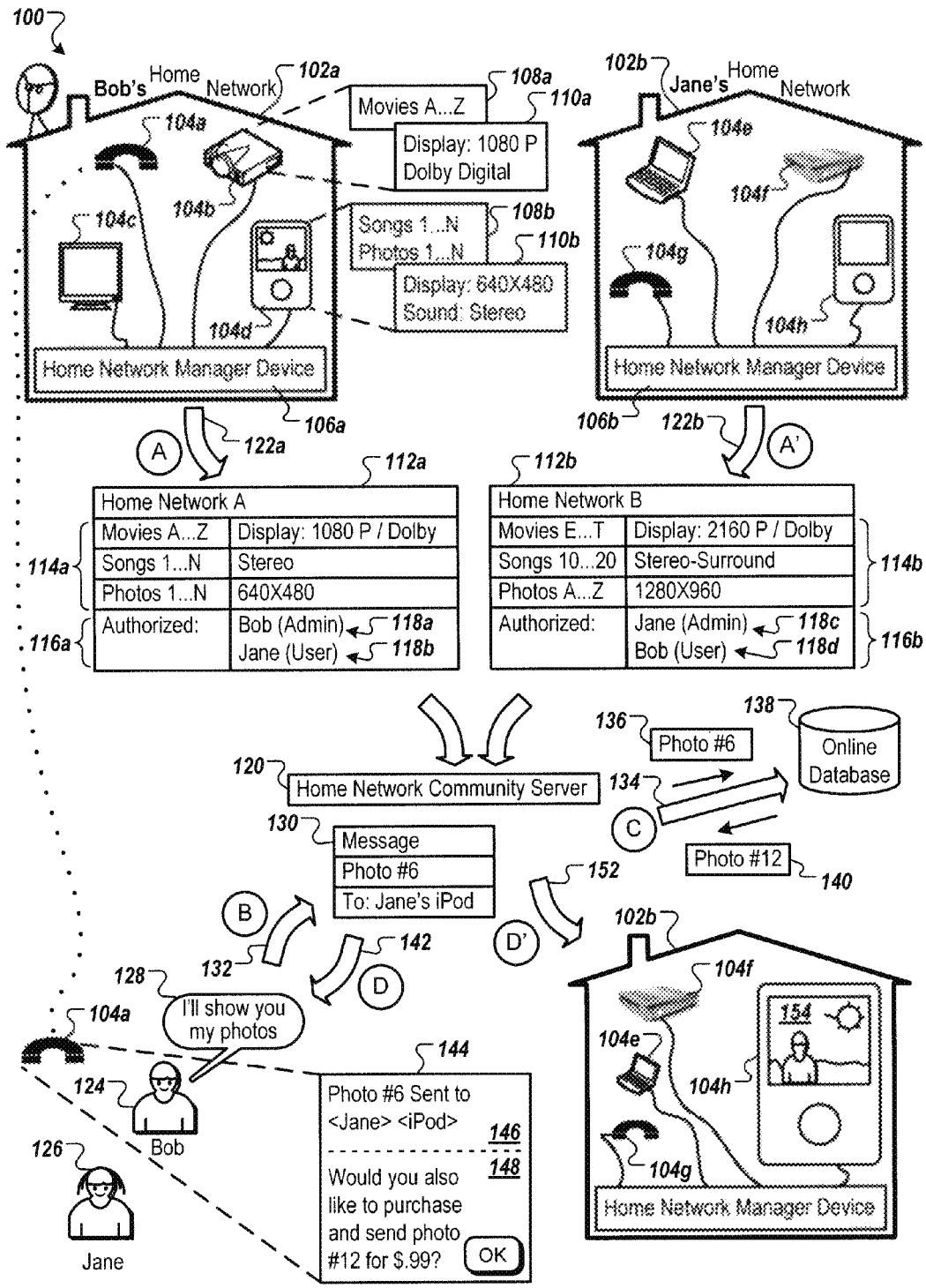
FIG. 1 is a contextual diagram illustrating an example media sharing system for sharing media between multiple home networks.

The enhanced content sharing framework described herein includes communities of content rendering and storing devices that are each managed by home network manager devices. The home network manager devices provide information to a home network community server, this information including, for example, a listing of all content stored on the various content rendering and storing devices, and the users who are authorized to retrieve or store the content. The listing of content may or may not identify which content storing devices store each discrete item of content.

Using the enhanced framework, authorized users may, for example, instruct the home network community server to move content from one device in a first community to another device in a second community without necessarily specifying the content storing device from which the content is to be moved. By contacting and instructing the home network manager devices or the individual content rendering and storing devices, the home network community server takes the necessary steps to implement the user's desired action, without requiring the user to provide content addressing or location information, or detailed technical commands tailored to each appropriate device.

This enhanced framework provides a straightforward approach for users to access their multimedia content (e.g., text, music, pictures, videos, etc), regardless of the physical or logical location of the content. For example, the framework may be implemented as system which is part of a residential LAN that is capable of connecting to a community of one or more consumer electronic devices in the home. Electronic devices may include personal computer (PCs), telephones, network-attached storage (NAS), digital picture frames (DPFs), cameras, set-top boxes (STBs), Digital Versatile Discs (DVDs), Internet Protocol Televisions (IPTVs), or other devices. The system may actively or passively "discover" (e.g., determine the existence of) content servers and players in the home network, index the content exposed by the servers regardless of the location of the content within the community, and gather capabilities of players.

In this way, the user may use the index to find multimedia content in a simplified manner, regardless of the physical location or logical address of the content. Once discovered, an authorized user may play or render the multimedia content on any appropriate or capable player, such as the big screen television in the living room (e.g., connected to an IPTV STB), a hi-fi in the bedroom, a portable player by the hot tub outside, a digital book, or a remote device such as an iPod. Furthermore, the system may seamlessly provide access to on-demand content stored on online servers.

Allowing user access to online content may provide content vendors or service providers to sell additional targeted content. For instance, if the user is looking for songs by the rock group U2, the system may provide the user with links to or information about U2 songs found locally (e.g., in the users home network) and may further identify free or paid online content associated with this group. When linked to online services in this way, the enhanced framework may dynamically use profile information defining user preferences and tastes, thus enabling targeted advertising.

The enhanced framework may also allow the user to access media remotely, or to seamlessly transmit content to and from other communities. For example, a user ("Jane") may use the system to define a "home network community" in which Jane may choose what content from which devices to share, and with whom. Selecting content to share may be performed, for example, by defining access privileges, rights and rules (e.g., best friend Alice may view all of Jane's library, but Bob may access only Jane's vacation pictures stored on her PC). Users may access resources available in a "buddy list," whose items are managed by content servers in trusted home networks as part of the system of this disclosure. For example, once Jane has established her home network community, Alice is free to view Jane's entire library, and Bob may look at the vacation pictures stored on Jane's PC.

The system may be configured and hosted in many forms, such as using PC software, mobile phone software (e.g., iPhone, Symbian, Windows Mobile, etc.), stand-alone or ad hoc hardware devices, or combinations thereof. In some implementations, mobile phone software may be a preferred solution, since it enables all the features anywhere, for example while in the home, at work, or while traveling.

From the user's perspective, the ability to access media remotely may eliminate physical barriers between the user and their content, and make this content immediately available. The framework may also eliminate the need for the user to learn multiple interfaces and commands associated with individual devices. Furthermore, the user may enjoy new content, discovered or tailored according to the users stated or inferred preferences.

From the service provider's or content vendor's point-of-view, the enhanced framework may provide another way to provide access to an online catalog, while reinforcing the trust relationship with the customer via the branded user interface. In some implementations, the enhanced framework may also facilitate a strong subscriber acquisition and retention strategy. If the service provider is also a mobile and fixed network operator (e.g., cell phones and land lines), the enhanced framework may be used as a driver for mobile-fixed convergence. For example, service providers may implement a policy that only those users who subscribe to both fixed and mobile services may enjoy remote access. In this way, mobile data traffic may increase, which may result in additional revenues for service providers.

In some implementations, the enhanced framework may enable the service provider to collect and use information about general user habits and tastes, creating custom profiles and offering custom advertising. For example, such information may be collected by a system during each use of the system by the user. In some implementations, the system may be offered free-of-charge to any user agreeing to surrender personal profile data, such as data that may be used in aggregate without leading to privacy or security issues for the user.

FIG. 1 illustrates an example media sharing system 100 for sharing media between multiple home networks 102a and 102b. In this example, the home network 102a includes a group of multiple electronic devices 104a-104d, each capable of rendering and/or storing media content. For example, a standard iPod is capable of rendering (playing, displaying, or otherwise outputting) music, thus making it a rendering device. The iPod is also a media storage device because it is capable of storing music (e.g., in MP3 or other format). As depicted, device 104a is a telephone, device 104b is a digital movie player, device 104c is a flat screen television, and device 104d is an iPod. As such, while Bob is at his home, he is capable of enjoying content on any of the devices 104a-104d, such as by sitting in the family room watching a football game on the flat screen television device 104c, or listening to his iPod 104d on the patio.

Home networks may be aggregated by means of a home network community server 120. Each individual home network (e.g., home networks 102a, 102b, etc.) can be managed by a single home network manager device (e.g., home network manager devices 106a and 106b). Communication between home networks may be possible by using the home network community server 120 as an intermediary. In some implementations, first and second home network manager devices (e.g., networks 102a and 102b) may make up a single home network manager device. Further, the first and second home networks may be implemented as a single home network.

The home network manager device 106a may transmit one or more discovery requests to one or more content rendering devices and content storing devices. Based on the discovery request, data identifying the content and identifying, and listing capabilities of, the one or more content rendering devices and content storage devices may be transmitted in response to the home network manager device 106a. Alternatively the home network manager device 106a may wait for the content rendering devices and content storing devices to broadcast their capabilities and identities.

Jane's home network 102b includes a laptop device 104e, a DVD player device 104f, a telephone device 104g, and an iPod device 104h. Each of Bob's and Jane's home networks 102a and 102b may include any number of electronic devices in addition to devices 104a-104h shown in FIG. 1.

Bob's home network 102a includes a home network manager device 106a capable of managing the devices 104a-104d. Management occurs using device information, such as communication protocol information that the home network manager device 106a uses to communicate with each of the devices 104a-104d. Moreover, the home network manager device 106a may collect, maintain and provide access to information for each device, such as the media contents and the specifications (or capabilities) of the devices in the home network. For example, the movie player device 104b may store movies A-Z 108a and has specifications 110a, such as being able to "display 1080 P" and having "Dolby Digital" sound. In another example, the iPod device 104d stores content 108b (e.g., "Songs 1 . . . N" and "Photos 1 . . . N") and has specifications 110b (e.g., "640×480" display and "Sound: Stereo").

The system 100 may use home network information 112a and 112b received from the home networks 102a and 102b, respectively. As shown in FIG. 1, the home network information 112a includes a presence table 114a and policy information 116a. Among other things, the presence table 114a provides an index of media content that is globally stored on Bob's home network 102a. For example, as shown, the presence table 114a identifies, within Bob's home network 102a, the existence of Movies A . . . Z, with specifications "1080 P/Dolby", "Songs 1 . . . N" in "Stereo", and "Photos 1 . . . N" with a "640×480" resolution.

The policy information 116a identifies users who are authorized to access the home network 102a. For instance, Bob, who inhabits the home in which his home network 102a is housed, is listed as the administrator 118a. Bob's girlfriend Jane is listed as an authorized user 118b. In some implementations, policy information 116a may include the types of information (e.g., movies, photos, etc.) to which a user (e.g., friends, family, etc.) has access. This information may be further specialized in other ways, such as by type (e.g., Jane only has access to Bob's vacation pictures), hours of access (e.g., Bob's friends can't watch movies past 2 am), particular television channels, or other access or use restrictions.

Home network information 112b for Jane's home network 102b includes a presence table 114b and policy information 116b. The presence table 114b provides an index of media content stored on Jane's home network 102b. For example, the presence table 114b identifies the existence of "Movies E . . . T" with specifications "2160 P/Dolby", "Songs 10 . . . 20" in "Stereo-Surround", and "Photos A . . . Z" with a "1280×960" resolution. The policy information 116b identifies users who are authorized to use Jane's home network 102b. For instance, Jane, who inhabits the home in which her home network 102b is housed, is listed as the administrator 118c. Jane's boyfriend Bob is listed as an authorized user 118d.

A home network community server 120 may manage the information from groups of user home networks (e.g., networks 102a and 102b). The home network community server 120 may link together data from home network information 112a and 112b, making it possible for users to share media content with other users.

In some implementations, the home network community server 120 may be deployed by the user's service provider, such as the company that provides the user's wireless phone service. In other implementations, the home network community server 120 may be provided or deployed by the users Internet service provider (ISP). In other implementations, the home network community server 120 may be deployed in a number of different of places.

Over time, information may be received from Bob's home network 102a and Jane's home network 102b, as indicated by arrows A 122a and A' 122b, respectively. At any time, media content in one user's home network may be shared with another authorized user. For example, Bob 124 may be talking to Jane 126 on the phone and say, "I'll show you my photos" 128. As a result, a message may be generated from Bob's mobile device requesting that the corresponding media content be provided from his home network to a particular content rendering device or content storing device of Jane's home network. This may occur, for example, by Bob selecting a photo from the screen (e.g., from a group of thumbnails) on his phone and selecting Jane as the recipient.

For example, Bob may initiate the request as message 130 to send "Photo #6" to "Jane's iPod." The system 100 may determine, based on the presence table 112a, that the particular content is stored on Bob's home network 102a. The system 100 may further determine, based on the policy information 116a, that the intended recipient of the media (e.g., Jane) is authorized to access the particular content on the first home network (e.g., Bob's photos) and the particular content storing device (e.g., Bob's disk or data store) needed to deliver the content, and that the sender of the media (e.g., Bob) is authorized to access the particular content rendering device and/or content storing device (e.g., Jane's media player) on the second home network to which deliver the content.

In some implementations, Bob's cell phone service may use the information in the message 132 to suggest a similar photo that Bob may purchase to send to Jane. Such a suggestion may be based, for example, on Bob's profile or history of purchases on the Internet. For example, as indicated by arrow C 134, the photo information 136 may be used to access an online database 138. As a result, a "photo #12" 140, which may be similar to photo #6 in some way, may be identified as a recommendation. As such, the recommendation may be forwarded to Bob 124, as indicated by arrow 142.

On the display 144 on Bob's phone, iPod or other device, the system 100 may include a success message 146 (e.g., "Photo #6 Sent to <Jane><iPod>"). The display 144 may also include a solicitation 148 (e.g., "Would you also like to purchase and send photo #12 for $0.99?") If Bob responds in a positive manner to the solicitation, the additional photo #12 140 may be also be sent to Jane. The system 100 may automatically charge Bob's account for the purchase, such as by adding the charge to Bob's phone bill, by charging Bob's credit or debit card, or using any other payment method.

In general, the handling requests for content, such as the current example involving Photos #6 and #12, may originate as a query term (e.g., "Eiffel Tower photos") from the user (e.g., Bob). For example, Bob may enter "Eiffel Tower photos" into a browser or similar interface on his cell phone, iPod, or other mobile device. The system 100 may use the query term to perform a local query of the presence table of the Bob's home network, and an online query of an online database (e.g., photos of Paris that may be purchased online). The search results may be presented to the user (e.g., Bob), such as on a search results page that includes a local results region and an online results region. The local results region may identify the content (e.g., Photo #6) stored on the Bob's home network which satisfies the query term. The online results region may identify content stored in the online database (e.g., Photo #12 and other photos from Paris) which satisfies the query, and which is not stored on the Bob's home network.

In some implementations, the system 100 may use user profile information from the first home network manager device and/or the home network community server in order to modify the online query of the online database. For example, if Bob is searching for photos of Paris and his user profile indicates that he is interested in art, the online results region may identify photos that match the query and his interests. As a result, the online results region may include photos from art museums in Paris. In some implementations, the message is received over the Internet from a mobile device operated by the user, from outside of a physical proximity of the first home network.

Jane may receive the photo #6 136, and optionally the photo #12 140 (if purchased by Bob) in her home network 102b, as depicted by reference D' 152. In general, reference D' 152 provides the particular content from the first home network (e.g., Bob's photo #6 stored in one of Bob's files) to the particular content rendering device or content storing device of the second home network (e.g., Jane's iPod). As a result, Jane may display Bob's photo(s) in a display screen 154 of her iPod 104h.

Figure 2:
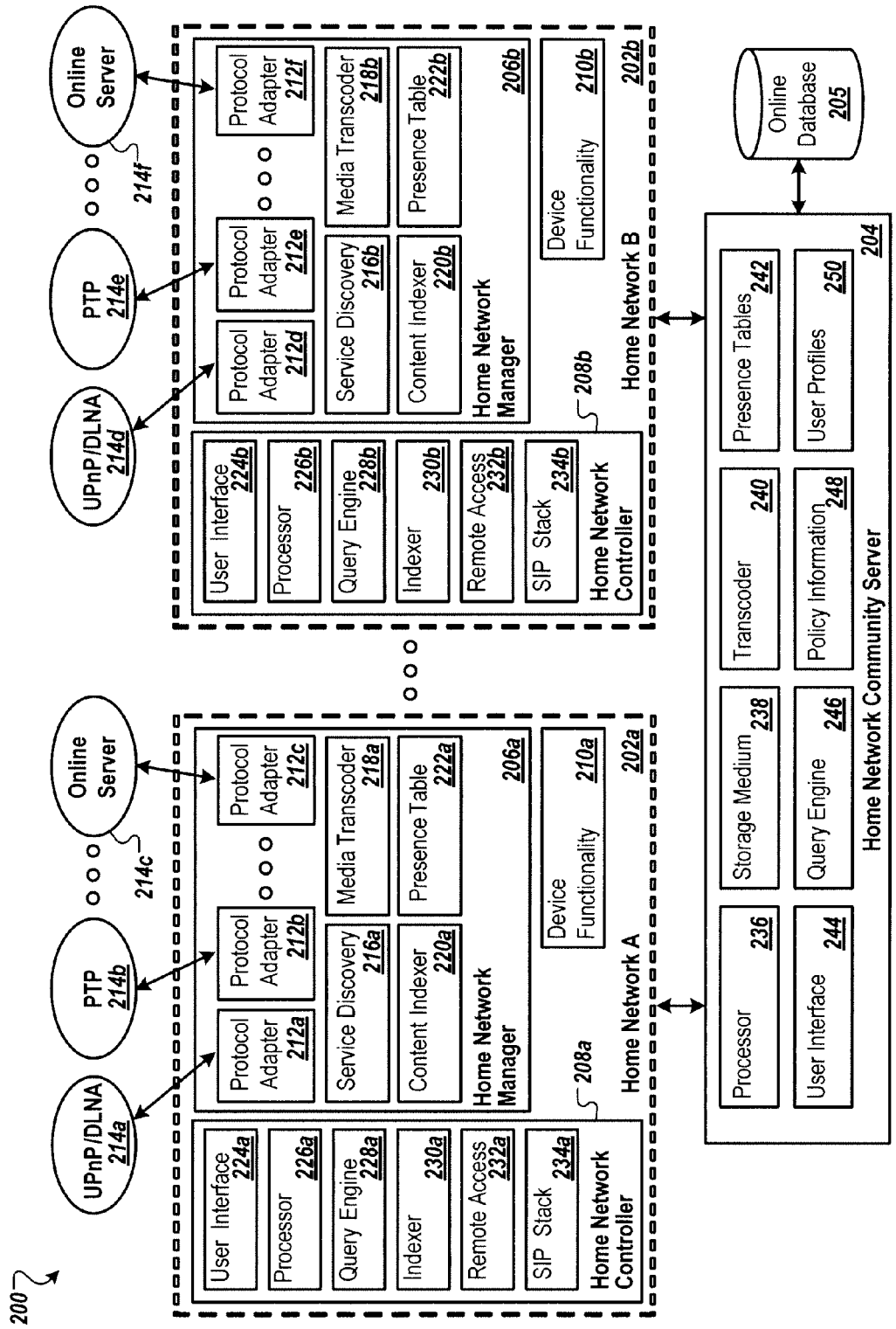
FIG. 2 is a block diagram of an example communications architecture between home networks using a home network community server.

FIG. 2 is a block diagram of an example communications architecture 200 between home networks A 202a and B 202b using a home network community server 204. The networks 202a and 202b, for example, may represent Bob's home network 102a and Jane's home network 102b, respectively, as described with respect to FIG. 1.

In one implementation, the architecture 200 may be configured in three logical layers: a convergence layer, aggregation layer, and a control and presentation layer. The convergence layer may enable in-home inter-working of different technologies for media sharing. For example, the convergence layer may allow Bob to access media from any of the devices in his home. The convergence layer may also provide mediation towards the aggregation layer.

The aggregation layer may logically connect groups of home networks of various users into home network communities. For example, Bob and Jane may be part of one or more home network communities where users in the group are able to share media using the system 100. The aggregation layer may also control access to home network resources and user profiles of various users.

The control and presentation layer provides the user interface to universal media access. For example, the control and presentation layer may include the components of the system 100 that provide the display 144 on Bob's phone, iPod or other user device that Bob may employ to interact with the system 100.

The home networks A 202a and B 202b each interact with the home network community server 204. The server 204 interacts with one or more online databases 205, which may be used to identify and provide online media content that is considered pertinent to users of the system 100. For instance, in the example described with regard to FIG. 1, the online database 205 may be used to identify photo #12 as a photo that Bob may want to buy to send to Jane. In some implementations, Bob's Internet service provider (ISP) or cell phone service may be the component of the system 100 that initiates access to the online database 205.

The home network A 202a includes a home network manager 206a, a home network controller 208a, and a device functionality module 210a. The home network controller 208a can be included on the control and presentation layer and can be implemented as software and/or as a device. For example, the user can interact with the system 100 by means of the home network manager 206a (e.g., installed on Bob's iPod touch). In some implementations, other components may be included in the home network A 202a, and some components may be included, in whole or in part, it other parts of the architecture 200.

The home network manager 206a may correspond to the home network manager device 106a. For example, the home network manager 206a may include software that executes on the device 106a, such as a separate network box that is provided to Bob to manage his home network. As such, the home network manager 206a may include software that executes in that box (e.g., the device 106a). The home network manager 206a includes protocol adaptors 212a through 212c, each used as a protocol for interfacing with enabled consumer electronics devices and media sources 214a through 214c. For example, the devices/sources 214a through 214c may correspond to various electronic components in Bob's home network 102a used for rendering and/or storing media content.

The device functionality module 210a can provide functionality information (e.g., capabilities to play and/or store certain types of media) for all devices within a home network. For example, if a movie is selected by the user for play within the home network A 202a, the device functionality module 210a can be used to identify devices that are functionally capable of playing (or rendering) the movie, and which devices may be able to store the movie.

The home network A 202a further includes a service discovery module 216a, a media transcoder 218a, a content indexer 220a, and a presence table 222a. The service discovery module 216a may determine, within a home network, the devices and types of service available, such as content storing devices and/or rendering capable devices. The media transcoder 218a performs digital-to-digital conversions from one digital format to another. In other words, transcoding may convert media content to match the listed capability of a particular content rendering device or content storing device on which the media content is to be played or stored.

For example, the media transcoder 218a may produce a bit stream for a digital photo (e.g., in JPG format) that allows the digital photo to be rendered on a different device, particularly one that is capable of processing bit streams. The content indexer 220a performs indexing on each of the devices in a particular home network. The content indexer 220a may access the devices 104a-104d in Bob's home network, creating an index of the content (e.g., songs, photos, movies, etc.) on each device. The output produced by the content indexer 220a may be stored in the presence table 222a, such as is depicted in the presence table 112a described with respect to FIG. 1. Because the home network manager 206a collects, manages and centralizes information about all of the devices in the home network, the home network manager 206a may be considered as part of the convergence layer.

The home network B 202b may include similar components, specifically a home network manager 206b, a home network controller 208b, and a device functionality module 210b. The home network manager 206b includes protocol adaptors 212d through 212f, each used as a protocol for interfacing with enabled consumer electronics devices and media sources 214d through 214d. The home network manager 206b further includes components 216b-222b, which may be the same as or different from similar components in the home network manager 206a. For example, different versions of software that comprises home network managers may exist, or different components may be optional, based, for example, on the level of service that the user has purchased from his Internet service provider or wireless phone provider. Similarly, the home network controller 208b may include components 224b-234b.

The device functionality module 210b can provide functionality information (e.g., capabilities to play and/or store certain types of media) for all devices within a home network. For example, the device functionality module 210b can be used to identify devices that are functionally capable of playing (or rendering) the movie, and which devices may be able to store the movie.

The home network community server 204 includes a processor 236, a storage medium 238, a transcoder 240, presence tables 242, a user interface 244, a query engine 246, policy information 248, and user profiles 250. The processor 236 may receive communications from, and send responses to, home networks within the community, such home networks A 202a, B 202b and/or others not shown in FIG. 2. The storage medium 238 may physically store the media content, such as photos, movies, music, recordings, or other content. The transcoder 240 may perform digital-to-digital conversions from one digital format to another.

The presence tables 242 may contain information regarding media content available in the home network, such as the type of media, the titles (e.g., songs, movies, photos, etc.), the format, parameters needed for communication, the status (e.g., online, busy, waiting for a response, etc.), the network's geographic location, or any other characteristic or quality. For example, the status information for devices in a home network can be used to allow remote management. Further, the presence table indexes the content without identifying the one or more content storing devices which store the content. As a result, the presence tables 242 may be used to process media requests (e.g., for particular content in a home network) that do not specify the one or more specific storing devices of the home network from which to provide the particular content.

The user interface 244 may include screens and controls that allow the user to interact with the system. For example, the user may employ the system to select media for his or her own use, or to authorize other users to have access to his media. The query engine 246 may be used to query media contents to which the user has access, and online sources for media the user may view or buy. The policy information 248 may include the list of authorized users who are allowed shared access of the user's media, and may define how that information may be used (e.g., pre-defined hours, access rights to groups of media or selected titles).

Users of the home network community servers 204 can serve as system administrators. They can use screens and controls to set up and manage the system 100. In some implementations, the home network community servers 204 can be hosted in a Service Provider/Telco Operator network or any other suitable network(s).

The user profiles 250 may include information about the user's media preferences, such as favorite artists, authors, movies, or songs. The user profiles 250 may include user-authorized personal information for the user, such as background, age, income, marital or other status, interests, hobbies, or any other characteristic. The system may use the user profiles 250 in order to recommend additional media content that the user may buy for himself or others.

Figure 3:
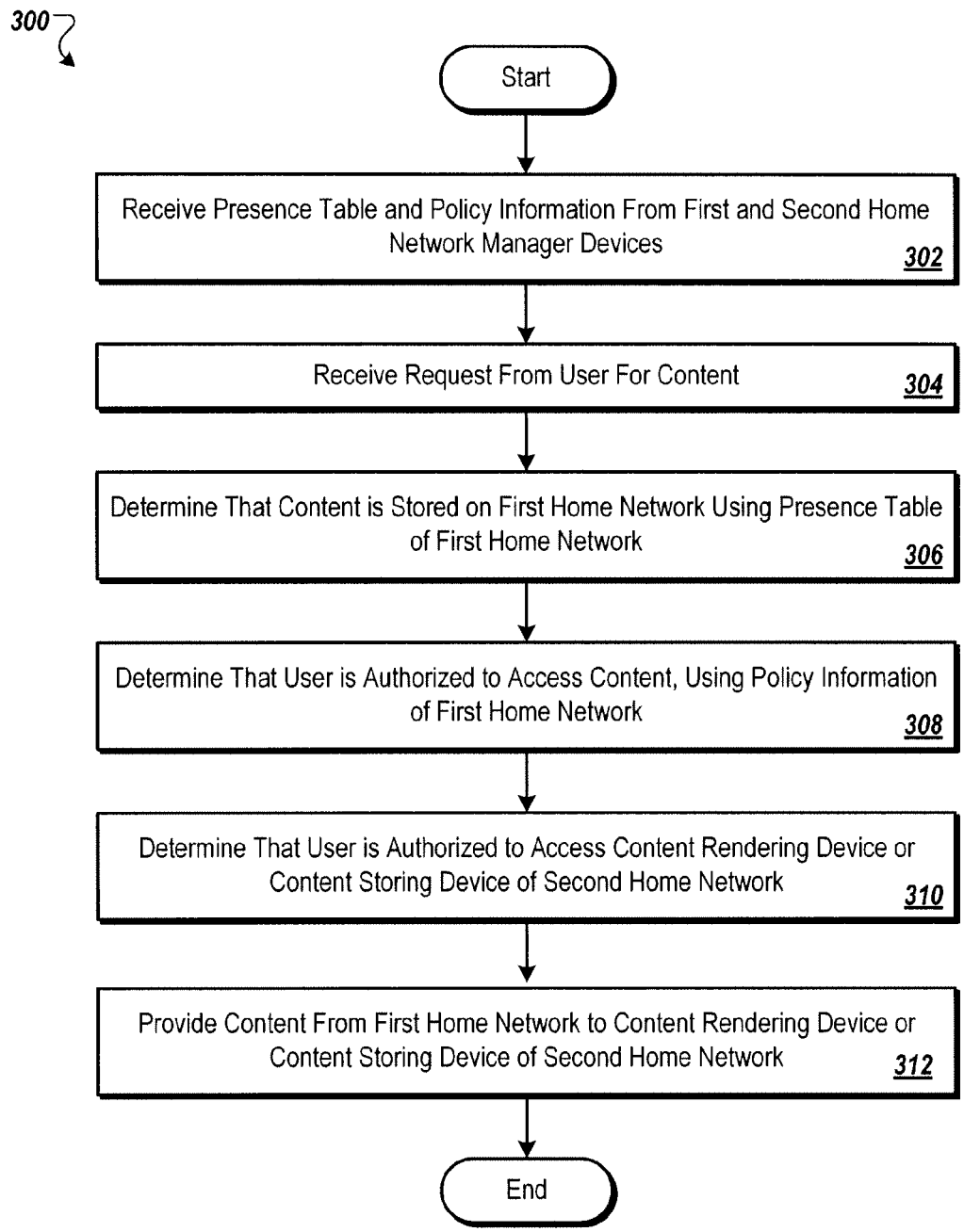
FIG. 3 is a flow diagram of an example process used by the system of FIG. 1.

FIG. 3 is a flow diagram of an example process 300 used by the system of FIG. 1. For example, referring to FIG. 1, the process 300 may be used by Jane and Bob for sharing and/or accessing media between multiple home networks 102a and 102b.

At reference 302, a presence table and policy information are received from first and second home network manager devices. For example, over time the system 100 may collect information for the presence tables 114a and 114b providing detailed information about media content on the systems 102a and 102b, respectively.

At reference 304, a request for content is received from a user. For example, Bob may issue a request from his cell phone, iPod or PDA to share a Photo #6 with Jane. In another example, Jane may be sitting at her house and want to watch one of Bob's movies. In either case, either user, Bob or Jane, may use the user interface 224a or 224b to select the media of interest and the desired action (e.g., send photo to a friend, or watch a favorite movie).

At reference 306, a determination is made that the requested content is stored on first home network using presence table of first home network. For example, the system 100 may check to see if the Photo #6 is available or exists on Bob's home network, or that the user of the system 100 is authorized to access that content. In another example, the system 100 may determine if the favorite movie requested by Jane is on her home network 102b or the home network of a friend to which she has been granted access.

At reference 308, a determination is made that the user is authorized to access content, using policy information of first home network. For example, if Jane is requesting one of the movies on Bob's home network 102a, the system 100 may access Bob's policy information 116a and 116b to check that Jane is an authorized user.

At reference 310, a determination is made that the user is authorized to access the content rendering device or the content storing device of the second home network 310. For example, if Jane is requesting to watch one of the movies on Bob's home network 102a, the system 100 may access Bob's policy information 116a and 116b to check that Jane is authorized to use Bob's rendering device (e.g., his movie player) or any other of Bob's devices (e.g., a movie storage device) needed by Jane to view the movie.

At reference 312, content from first home network is provided to the content rendering device or the content storing device of the second home network. For example, if the system 100 determines that Jane is authorized to view the movie, the system 100 may deliver the movie to Jane. As result, Jane may watch the movie on her iPod or device even though the movie is physically playing within Bob's home network 102a.

Figure 4:
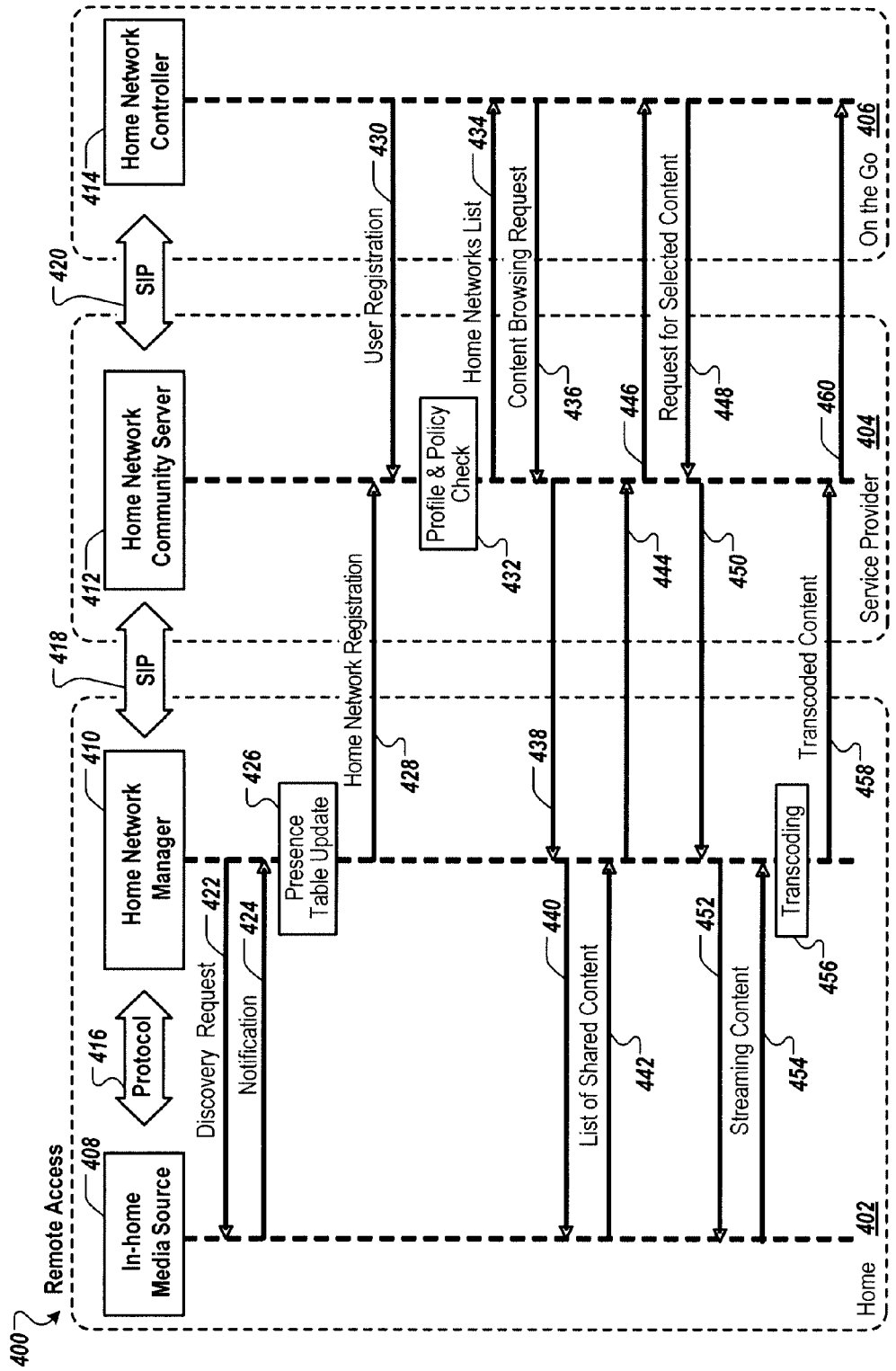
FIG. 4 is a swim-lane diagram of an example sequence of actions used in remote access.

FIG. 4 is a swim-lane diagram of an example sequence of actions 400 used in remote access. For example, remote access to specific media content may occur by a user using his mobile device, interacting with one or more home networks, a service provider, or a mobile phone network. As an example, referring to FIG. 1, the sequence of actions 400 may occur when Jane requests Bob's media content, such as requesting to watch one of his movies.

As depicted in FIG. 4, the sequence of actions 400 involve a home network 402, a service provider 404 and a user 406. The sequence of actions 400 occur among the various components of the home 402, specifically an in-home media source 408 and a home network manager 410. The sequence of actions 400 further involve a home network community server 412 which ties together home networks of the home 402 and others not shown in FIG. 4. The sequence of actions 400 further involve a home network controller 414 which may be, for example, software executing on a user's mobile device.

Communication among the components 408 to 412 may include protocols 416 and Session Initiation Protocol (SIP) message interfaces 418 and 420. In some implementations, other communications may be used, including wired access, local area networks (LANs), etc. The protocols 416 may correspond to (and use) the protocol adaptors 212a-212f as described with respect to FIG. 2.

Processing may begin in a discovery request 422 when, for example, the home network manager 410 accesses various multiple electronic devices (e.g., devices 104a-104d), each capable of rendering and/or storing media content. In response to the discovery request 422, the in-home media source (e.g., a movie player) may provide a notification 424 to the home network manager 410 that "identifies" the media source to the home network manager 410. For example, identification may include information about the manufacturer of the device, its model number, registration, specification, communication protocols, etc. The home network manager 410 may use the information to update the presence table 426, such as information that may be stored in the presence table 114a and 114b described with respect to FIG. 1. Discovery requests 422 and notifications 424 may be repeated as needed over time for each media source in the home network.

A home network registration 428 may register the home network 402 with the home network community server 412, which may also receive registrations from other home networks not shown in FIG. 4. A user registration 430 may be sent by the home network controller 414 to the home network community server 412. In some implementations, registration operations 428 and 430 may occur when media sharing software is installed or registered (e.g., upon payment and accepting the licensing agreement) at the home network 402 and on the home network controller 414 (e.g., software installed on the user's mobile device). 100821 Information received by the home network community server 412 may be used to update the profile and policy information 432, such as the information stored in the policy information 116a and 116b (refer to FIG. 1). The system may provide a list of home networks 434 to the user's home network controller 414 so that the user, for example, is ready to begin (or resume) accessing media content remotely (e.g., using mobile device such as an iPod, mobile phone, PDA, wireless laptop, etc.)

In a content browsing request operation 436, the user may request a list of available media content. For example, Jane may display a list of movie titles corresponding to movies on the community of home networks to which she has access. The movies may physically reside on any accessible home network, including her own, Bob's, or those of other friends or family members. The request 436 is sent to the home network community server 412, which forwards the request 438 to the home network manager 410. In some implementations, the forwarding may be performed in whole or in part by the user's (e.g., Jane's) service provider. The home network manager 410 in turn may issue a request 440 to the corresponding in-home media source 408. In response to the original content browsing request 436 (and subsequent forwarded requests), the list of shared content 442 corresponding to the request is sent to the home network manager 410, forwarded 444 to the home network community server 412, which in turn forwards it to the home network controller 414. Upon receipt of the list of shared content, the home network controller 414 may display the list to the user, such as within a user interface executing on the user's remote device.

From the list of shared content, the user may select one or more items. For example, Jane may select a movie title from the list that corresponds to a movie that resides somewhere on Bob's home network. Depending on the users selection, a request for selected content 448 may be sent to the home network community server 412, forwarded 450 to the home network manager 410, and forwarded again 452 to the in-home media source 408. In response to the request, the in-home media source 408 may begin streaming content 454. Depending on the digital format of the content and the format needed by the user's remote device, the home network manager 410 may perform transcoding 456 on the streamed content and send the transcoded content 458 to the home network community server 412. From there, the transcoded content 460 may be forwarded to the home network controller 414, which may begin streaming the content on the user's remote device.

The sequence of actions 400 depicted in FIG. 4 represents one general implementation of a sequence of actions that may be used in sharing media between home networks. However, other sequences of actions are possible in other implementations. For example, a different sequence of actions may be used if two different users want to use the same media rendering device at the same time. In another implementation, users may schedule their proposed usage times, such as Jane specifying that she plans to watch a movie at Bob's house at 8 PM on Thursday (while sitting at her house).

In some implementations, the arrows and actions depicted in FIG. 4 may vary, such as by which component 408-414 performs the action, receives the request, etc. For instance, some requests may not flow all the way back to the in-home media source 408, but rather they may be responded to directly by the home network manager 410 and/or components 408-414. For example, referring to FIG. 4, the content browsing request 436 from the home network controller 414 may stop at (and be handled by) the home network community server 412 or the home network manager 410, instead of being passed all the way back to the in-home media source 408. This may occur, for example, if those other components 408-414 have all the data necessary to respond to such a request. Thus, the arrows are merely exemplary, as are the arrows used in FIGS. 5, 6A and 6B.

Figure 5:
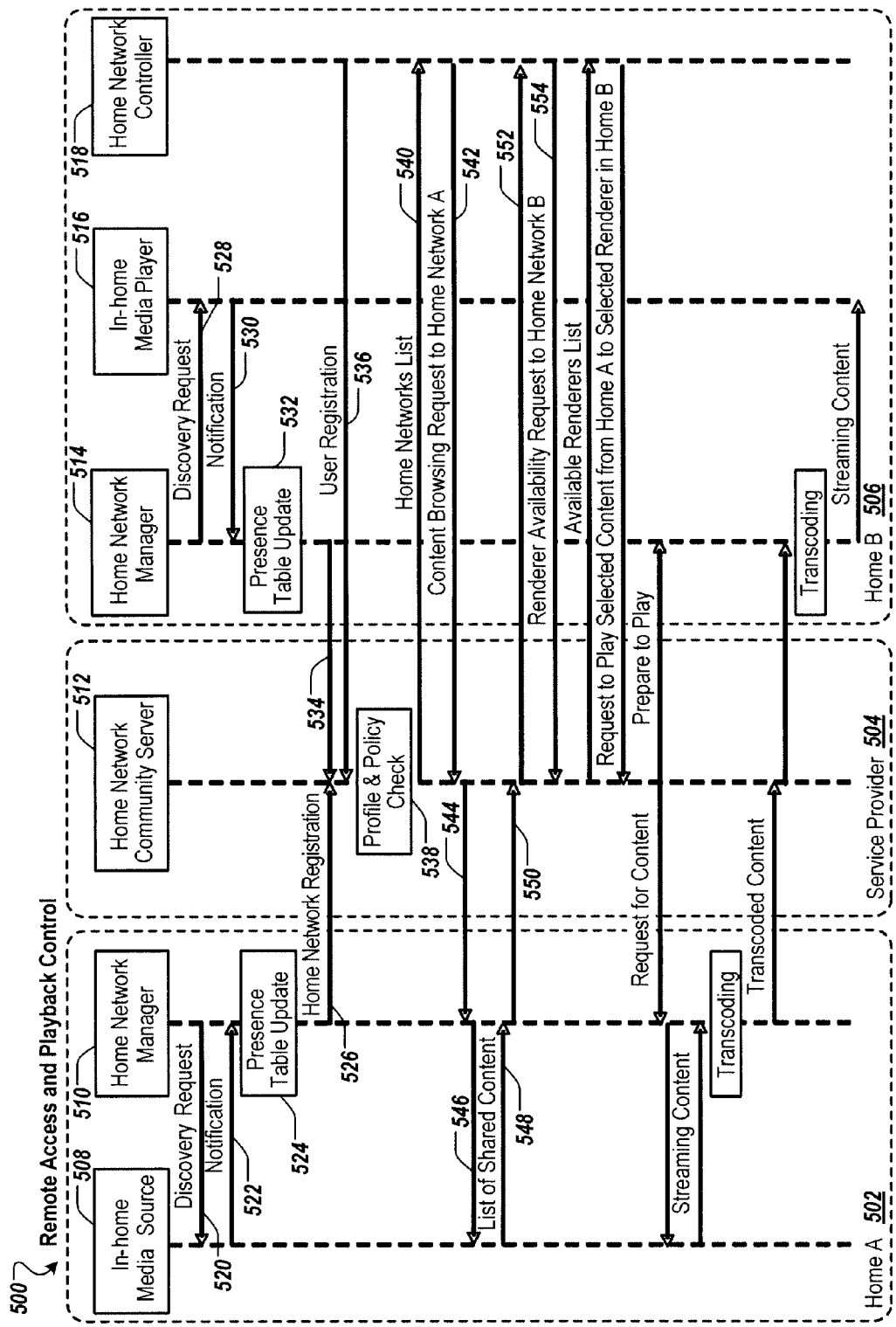
FIG. 5 is a swim-lane diagram of an example sequence of actions used in remote access and playback control.

FIG. 5 is a swim-lane diagram of an example sequence of actions 500 used in remote access and playback control. For instance, interactions may occur among two home networks, such as home network A 502 and home network B 506, and a service provider 504. As an example, referring to FIG. 1, the sequence of actions 500 may occur when Jane, in home network B 506, requests media content from Bob's home network A 502.

As depicted in FIG. 5, the sequence of actions 500 occur among the various components of the home network A 502, specifically an in-home media source 508 and a home network manager 510. The sequence of actions 500 also occur among the various components of the home network B 506, specifically a home network manager 514, an in-home media player 516, and a home network controller 518. The sequence of actions 500 further involve a home network community server 512 which ties together home networks A 502 and B 506.

Processing may begin with a discovery request 520 that occurs, for example, when the home network manager 510 accesses any of the various multiple electronic devices (e.g., devices 104a-104d), each capable of rendering and/or storing media content. The access occurs in order to discover or determine the existence and capabilities of the devices within the home network 502. In response to the discovery request 520, the in-home media source (e.g., a movie player) may provide a notification 522 to the home network manager 510 that "identifies" the media source to the home network manager 510. For example, identification may include information about the manufacturer of the device, its model number, registration, specification, communication protocols, etc. The home network manager 510 may use the information to update the presence table 524, such as information that may be stored in the presence table 114a and 114b described with respect to FIG. 1. A home network registration 526 may register the home network 502 with the home network community server 512.

Similarly, within the home network B 506, discovery request 528 and notification 530 may be used to populate the presence table 532. Moreover, a home network registration 534 may register the home network 506 with the home network community server 512. At the same time, or at a different time, a user registration 536 may be sent by the home network controller 518 to the home network community server 512. Information received by the home network community server 512 may be used to update the profile and policy information 538, such as the information similar to that stored in the policy information 116a and 116b (refer to FIG. 1). The system may provide a list of home networks 540 to the user's home network controller 518 so that the user, for example, is ready to begin (or resume) accessing media content remotely (e.g., using mobile device such as an iPod, mobile phone, PDA, wireless laptop, etc.)

A request to play selected content from home A 542 to a selected renderer in home B 506 may be initiated by a content browsing request to home network A 502. For example, Jane may want to browse a list of movies in order to select one to watch at her house. The movies may physically reside on any accessible home network, including her own, Bob's, or those of other friends or family members. The request 542 is sent to the home network community server 512, which forwards the request 544 to the home network manager 510. In some implementations, the forwarding may be performed in whole or in part by the user's (e.g., Jane's) service provider.

In turn, the home network manager 510 may issue a request 546 to the corresponding in-home media source 508. In response to the original content browsing request 542 (and subsequent forwarded requests), the list of shared content 548 corresponding to the request is sent to the home network manager 510, forwarded 550 to the home network community server 512, which in turn forwards 552 it to the home network controller 518. Upon receipt of the list of shared content, the home network controller 518 may display the list to the user, such as within a user interface executing on the user's remote device.

Upon receipt of the list of movies, Jane may select a particular movie to watch. In response, the home network controller 518 may prepare for Jane's movie watching by determining if a rendering device capable of playing Jane's selected movie is available. As a result, the home network controller 518 may formulate and send a renderer availability request B 554 for home network B to the home network community server 512. In response, the home network community server 512 may provide an available renderers list 556.

Upon the receipt of the available renderers list 556, the user may use an interface to select a renderer and send a play request 558 to play the selected media content (e.g., one of Bob's movies stored on home network 502) on a selected renderer in the home network 506. Upon receipt of the request 558, the home network community server 512 may prepare to receive and play (560) the media content, such as by initiating a device in Jane's home network B 506 that is capable of displaying the movie.

The home network community server 512 may also send a content request 562 to the home network A 502. The home network manager 510 may receive the request 560 and forward the request 564 to the in-home media source 508, such as the media storage device that stores the movie that Jane wants to watch. The in-home media source 508 may begin streaming content 566 to the home network manager 510, which may perform transcoding 568, if necessary, on the content. The transcoded content 570 may be sent to the home network community server 512, which may forward the content 572 to the home network 506. If necessary, additional transcoding 574 may occur on the content before it is streamed 576 to the user's rendering device in the home network 506. For example, Jane may begin to watch the movie on her iPod or other rendering device using a transcoded bit stream of the movie stored in Bob's home network A 502.

Figure 6A:
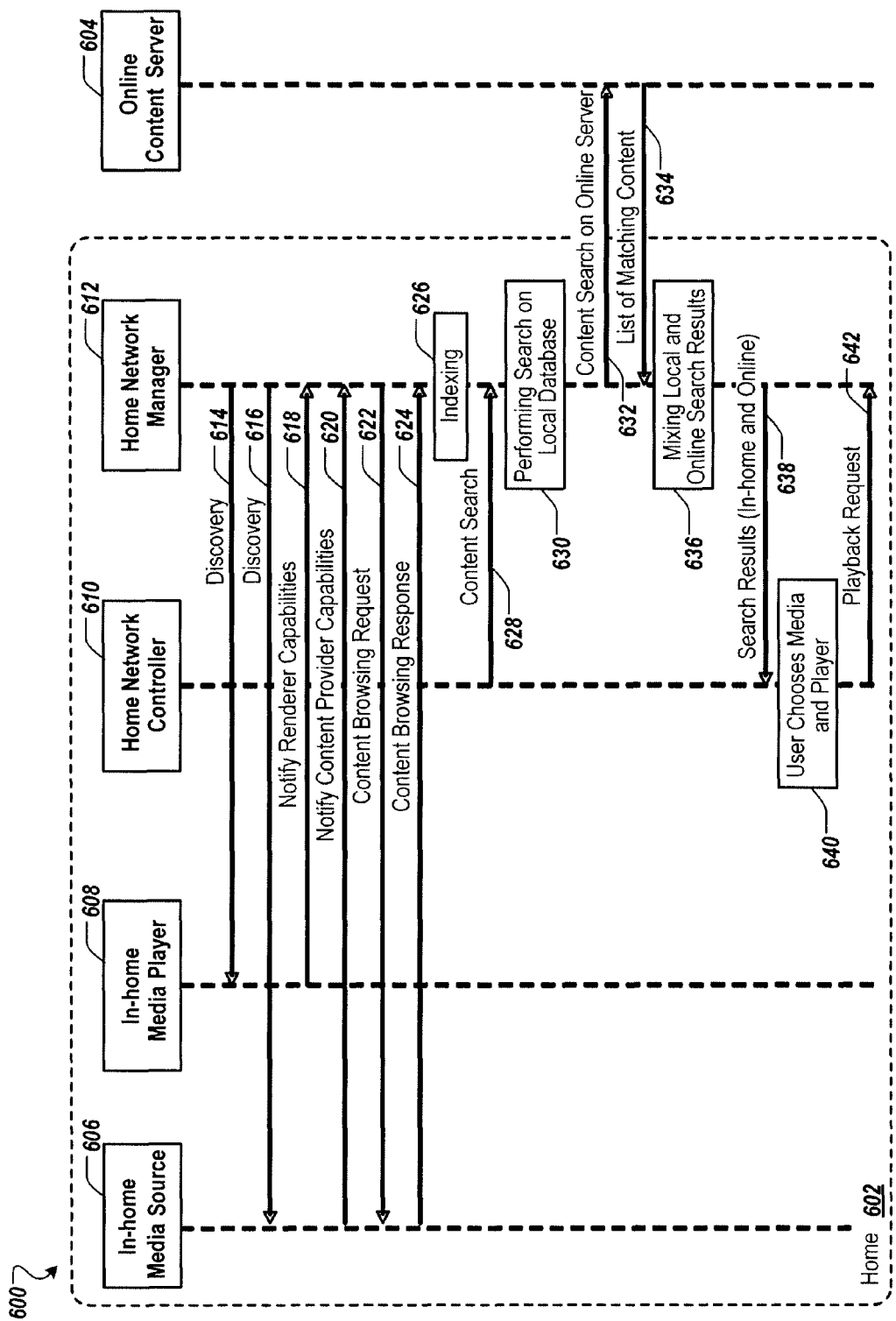
FIGS. 6A and 6B are swim-lane diagrams showing an example sequence of actions for in-home access and playback control.
Figure 6B:
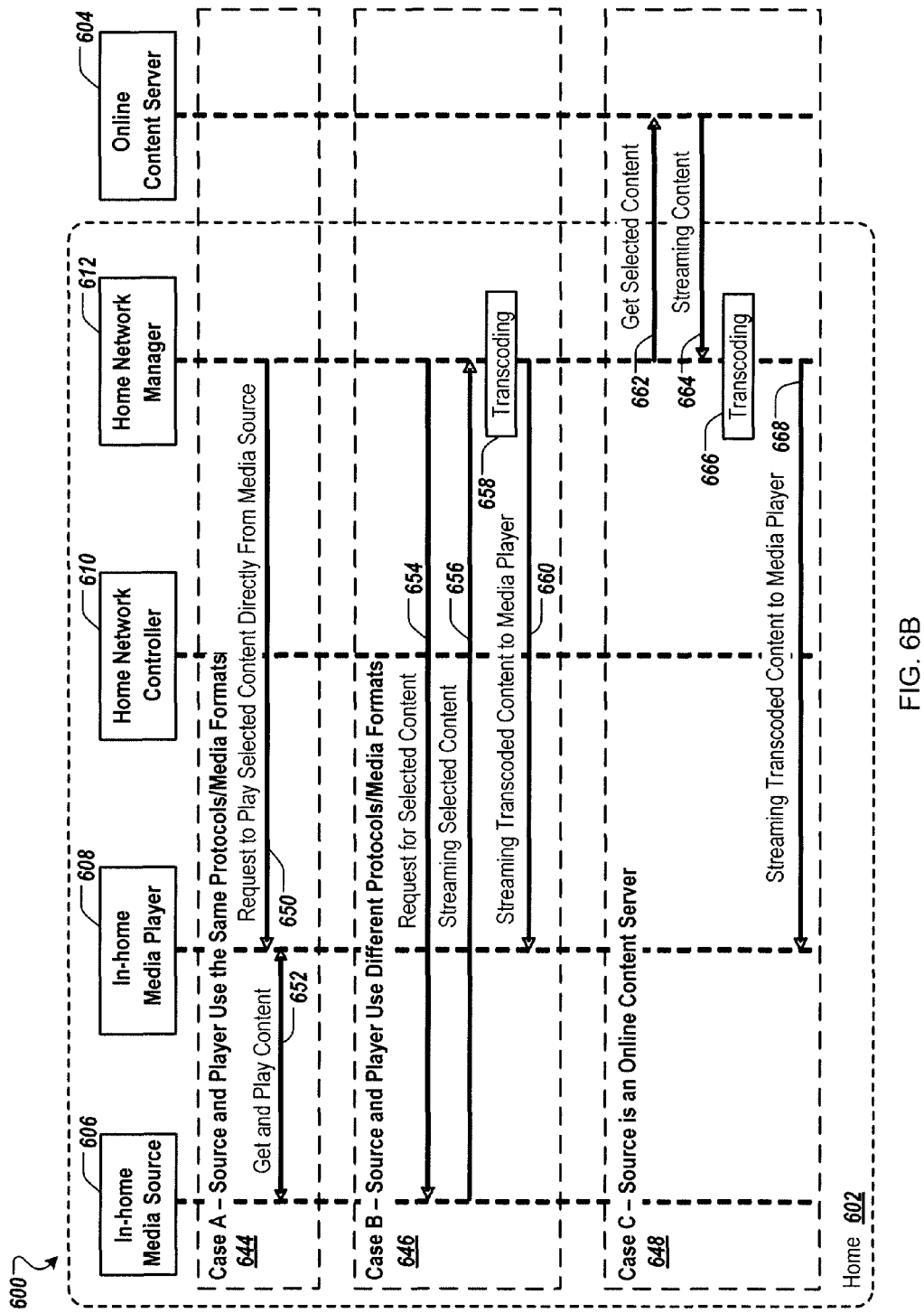

FIGS. 6A and 6B are swim-lane diagrams showing an example sequence of actions 600 for in-home access and playback control. The actions 600 occur among a home network 602 and an online content server 604. For example, the home network 602 may be any of the home networks 502a or 502b described with respect to FIG. 1. The home network 602 may include an in-home media source 606, an in-home media player 608, a home network controller 610, and a home network manager 612. These components of the home network 602 may be similar to the components of other home networks described above.

Processing may start when the home network manager 612 performs discovery 614 and 616 to determine available media storage devices and rendering devices, respectively, within the home network 602. In response, notifications 618 and 620 may be provided to the home network manager 612.

In order to prepare for content searches that a user may perform for selected media content (e.g., based on specific titles, etc.), the system may scan devices within the home network 602. The home network manager 612 may issue one or more content browsing requests 622. In response, the in-home media source 606 may provide a response 624. The home network manager 612 may perform indexing 626 based on the content response, such as to facilitate more efficient identification and searching of media content in the future.

When the user is ready to select media content (e.g., identify a movie to watch), the home network controller 610 may issue a content search 628, such as based on user selections in a user interface). The home network manager 612 may perform a local database search 630. The home network manager 612 may also perform a content search 632 on the online content server 604, and in response, receive a list of matching content 634. The home network manager 612 may mix the local and online search results 636, and provide the search results 638 to the home network controller 610.

The user may choose the media and media player 640 and issue a playback request 642. Depending on the format of the media and the capabilities of the media rendering devices available for playing the media, different cases may occur, as will be described for cases 644, 646 and 648.

Referring to FIG. 6B, in case A 644, the source and player use the same protocols/media formats. For example, the movie selected by Jane is in a format that is immediately playable on the selected rendered or player. As a result, the home network manager 612 may simply issue a request 650 to play the selected content directly from the media source, and the in-home media player 608 to get and play the content 652.

In case B 646, the source and player use different protocols/media formats. In this case, the home network manager 612 may request the selected content 654 from the in-home media source 606. In response, the in-home media source 606 may begin streaming the content 656. The home network manager 612 may perform transcoding 658 of the streamed content, and stream the transcoded content 660 to the in-home media player 608.

In case C 648, the source of the media content is an online content server. The home network manager 612 may request the selected content 662 from the online content server 604. In response, the online content server 604 may begin streaming the content 664 to the home network manager 612. The home network manager 612 may perform transcoding 666 of the streamed content, and stream the transcoded content 668 to the in-home media player 608.

Figure 7:
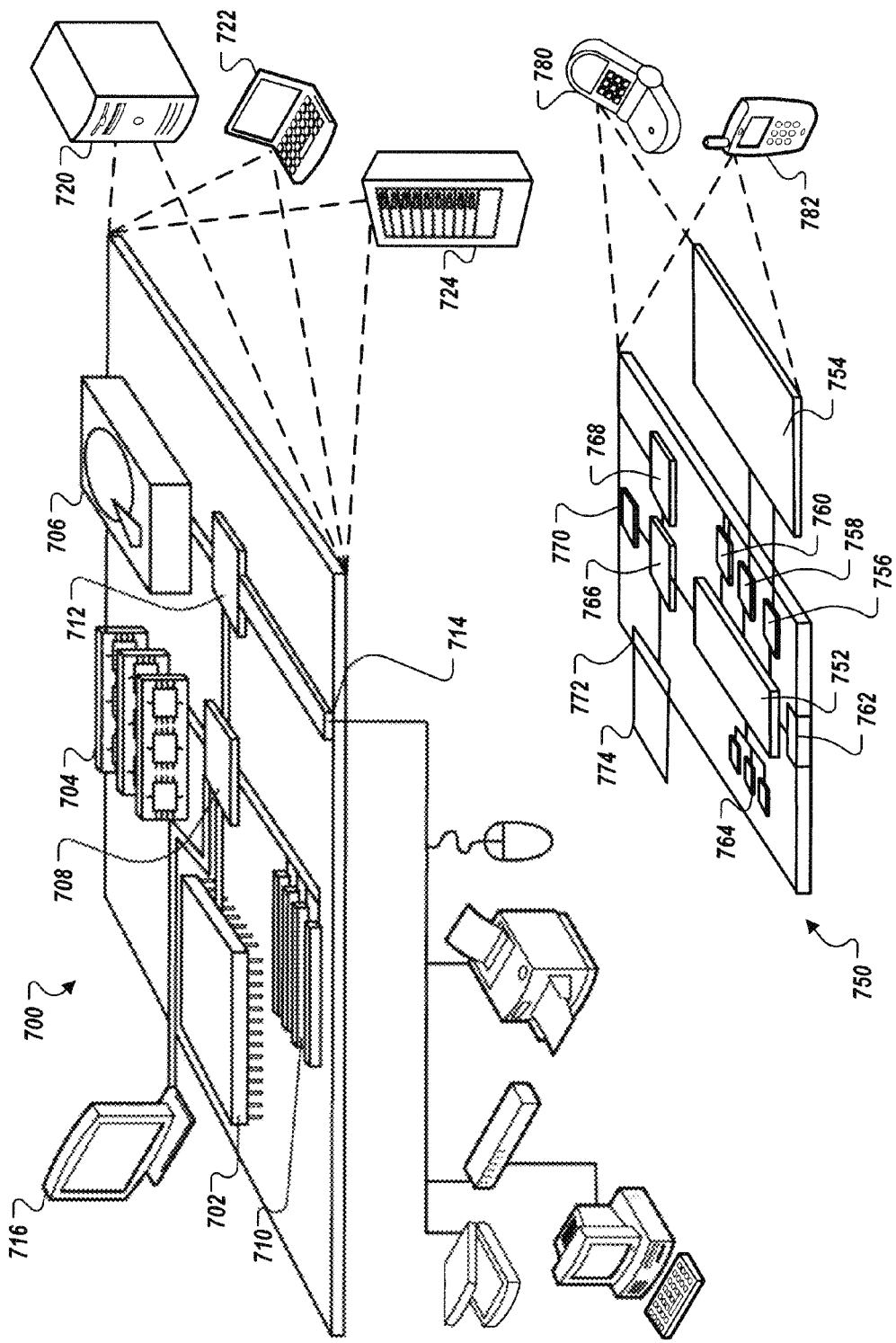
FIG. 7 is a block diagram of computing devices that may be used to implement the enhanced content sharing framework.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 may process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a computer-readable medium. In one implementation, the memory 704 is a volatile memory unit or units. In another implementation, the memory 704 is a non-volatile memory unit or units.

The storage device 706 is capable of providing mass storage for the computing device 700. In one implementation, the storage device 706 is a computer-readable medium. In various different implementations, the storage device 706 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of duties is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 may process instructions for execution within the computing device 750, including instructions stored in the memory 764. The processor may also include separate analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD display or an OLED display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication (e.g., via a docking procedure) or for wireless communication (e.g., via Bluetooth or other such technologies).

The memory 764 stores information within the computing device 750. In one implementation, the memory 764 is a computer-readable medium. In one implementation, the memory 764 is a volatile memory unit or units. In another implementation, the memory 764 is a non-volatile memory unit or units. Expansion memory 774 may also be provided and connected to device 750 through expansion interface 772, which may include, for example, a SIMM card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS receiver module 770 may provide additional wireless data to device 750, which may be used as appropriate by applications running on device 750.

Device 750 may also communication audibly using audio codec 760, which may receive spoken information from a user and convert it to usable digital information. Audio codex 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
receiving, by a home network community server, first policy information and second policy information from a first home network manager device and second home network manager device, respectively, wherein:
the first home network device manager and the second home network device manager manage a first home network and a second home network, respectively;
the first home network and the second home network each include one or more content rendering devices and one or more content storing devices;
the home network community server serves as an intermediary between the first home network and the second home network; and
the first policy information and the second policy information identify users who are authorized to access the first home network and the second home network, respectively;
receiving, by the home network community server, a first presence table from the first home network manager device, wherein the first presence table indexes all content stored on the first home network;
receiving, by the home network community server, a second presence table from the second home network manager device, wherein the second presence table indexes all content stored on the second home network;
receiving, by the home network community server and from a device operated by a user from outside of a physical proximity of the first home network and the second home network, a message from the user requesting that particular content be provided from the first home network to a particular content rendering device or a particular content storing device of the second home network;
determining, by the home network community server and based on the first presence table, that the particular content is stored on the first home network;
determining, by the home network community server and based on the first policy information, that the user is authorized to access the particular content on the first home network;
determining, by the home network community server and based on the second policy information, that the user is authorized to access the particular content rendering device or the particular content storing device of the second home network; and
providing, by the home network community server, the particular content from the first home network to the particular content rendering device or the particular content storing device of the second home network based on determining that: (i) the particular content is stored on the first home network, (ii) the user is authorized to access the particular content, and (ii) the user is authorized to access the particular content rendering device or the particular content storing device of the second home network.

2. The method of claim 1, wherein:
the message requests that the particular content be provided from the first home network without specifying the one or more content storing devices of the first home network from which to provide the particular content.

3. The method of claim 1, wherein:
the first home network device manager and the second home network manager device comprise a single home network manager device, and
the first home network and the second home network comprise a single home network.

4. The method of claim 1, wherein the one or more content rendering devices and the one or more content storing devices further comprise:
a personal computer (PC);
a telephone;
a network-attached storage (NAS);
a digital picture frame (DPF);
a camera;
a set-top box (STB);
a digital versatile disc (DVD) recorder; and
an Internet protocol television (IPTV).

5. The method of claim 1, wherein, for each of the first home network and the second home network:
the first presence table further identifies, and lists capabilities of the one or more content rendering devices of the first home network and the one or more content storing devices of the first home network,
the second presence table further identifies, and lists capabilities of the one or more content rendering devices of the second home network and the one or more content storing devices of the second home network,
the first policy information further lists a level of authorization of the users who are authorized to access the first home network, and
the second policy information further lists a level of authorization of the users who are authorized to access the second home network.

6. The method of claim 5, further comprising transcoding the particular content to match the listed capability of the particular content rendering device or content storing device.

7. The method of claim 1, further comprising:
performing, using a query term received from the user, both a local query of the first presence table of the first home network, and an online query of an online database; and
providing a search results page to the user, the search results page comprising:
a local results region identifying the content stored on the first home network which satisfies the query term, and
an online results region identifying content stored in the online database which satisfies the query, and which is not stored on the first home network.

8. The method of claim 7, further comprising:
receiving user profile information from the first network manager device,
wherein the online query of the online database is performed using the user profile information.

9. The method of claim 1, wherein the message is received over the Internet from a mobile device operated by the user, from outside of a physical proximity of the first home network and the second home network.

10. The method of claim 1, wherein the particular content is provided over the Internet to a mobile content rendering device or content storing device of the second home network, which is disposed outside of a physical proximity of the first home network.

11. The method of claim 1, further comprising:
providing a list to the user identifying (i) the one or more content rendering devices and the one or more content storing devices of the first home network that the user is authorized to access, and (ii) all of the content stored on the first home network,
wherein the list does not identify which of the one or more content storing devices of the first home network stores the content.

12. The method of claim 1, further comprising:
transmitting a discovery request from the first home network manager device to the one or more content rendering devices and the one or more content storing devices of the first home network; and
receiving, from the one or more content rendering devices and the one or more content storing devices, and based on the discovery request, data identifying the content and identifying, and listing capabilities of, the one or more content rendering devices and the one or more content storage devices.

13. The method of claim 1, wherein providing the particular content further comprises transcoding, then streaming the particular content to the particular content rendering device or the particular content storing device of the second home network.

14. The method of claim 1, wherein the one or more content rendering devices and the one or more content storing devices comprise a single device capable of both rendering and storing content.

15. The method of claim 1, further comprising:
providing a list of home networks that the user is authorized to access; and
providing a list of all content stored on the home networks that the user is authorized to access, without identifying individual content rendering devices or content storing devices of the listed home networks.

16. The method of claim 1, further comprising transmitting a signal to the second home network manager device indicating that the particular content is to be provided, based on determining that the particular content is stored on the first home network, that the user is authorized to access the particular content, and that the user is authorized to access the particular content rendering device or content storing device of the second home network.

17. The method of claim 1, further comprising providing a notification to the user based on determining that the particular content is not stored on the first home network, that the user is not authorized to access the particular content, or that the user is not authorized to access the particular content rendering device or content storing device of the second home network.

18. The method of claim 1, wherein the message comprises a Session Initiation Protocol (SIP) message.

19. A system comprising:
one or more computers; and
a computer-readable medium coupled to the one or more computers having instructions stored thereon which, when executed by the one or more computers, cause the one or more computers to perform operations comprising:
receiving, by a home network community server, first policy information and second policy information from a first home network manager device and second home network manager device, respectively, wherein:
the first home network device manager and the second home network device manager manage a first home network and a second home network, respectively;
the first home network and the second home network each include one or more content rendering devices and one or more content storing devices;
the home network community server serves as an intermediary between the first home network and the second home network; and
the first policy information and the second policy information identify users who are authorized to access the first home network and the second home network, respectively;
receiving, by the home network community server, a first presence table from the first home network manager device, wherein the first presence table indexes all content stored on the first home network;
receiving, by the home network community server, a second presence table from the second home network manager device, wherein the second presence table indexes all content stored on the second home network;
receiving, by the home network community server and from a device operated by a user from outside of a physical proximity of the first home network and the second home network, a message from the user requesting that particular content be provided from the first home network to a particular content rendering device or a particular content storing device of the second home network;

determining, by the home network community server and based on the first presence table, that the particular content is stored on the first home network;

determining, by the home network community server and based on the first policy information, that the user is authorized to access the particular content on the first home network;

determining, by the home network community server and based on the second policy information, that the user is authorized to access the particular content rendering device or the particular content storing device of the second home network; and providing, by the home network community server, the particular content from the first home network to the particular content rendering device or the particular content storing device of the second home network based on determining that: (i) the particular content is stored on the first home network, (ii) the user is authorized to access the particular content, and (ii) the user is authorized to access the particular content rendering device or the particular content storing device of the second home network.

20. The system of claim 19, wherein, for each of the first home network and the second home network:

the first presence table further identifies, and lists capabilities of the one or more content rendering devices of the first home network and the one or more content storing devices of the first home network, the second presence table further identifies, and lists capabilities of the one or more content rendering devices of the second home network and the one or more content storing devices of the second home network, the first policy information further lists a level of authorization of the users who are authorized to access the first home network, and the second policy information further lists a level of authorization of the users who are authorized to access the second home network.

21. The system of claim 19, wherein the operations further comprise:

performing, using a query term received from the user, both a local query of the first presence table of the first home network, and an online query of an online database; and providing a search results page to the user, the search results page comprising:

a local results region identifying the content stored on the first home network which satisfies the query term, and an online results region identifying content stored in the online database which satisfies the query, and which is not stored on the first home network.

22. The system of claim 19, wherein the operations further comprise:

providing a list to the user identifying (i) the one or more content rendering devices and the one or more content storing devices of the first home network that the user is authorized to access, and (ii) all of the content stored on the first home network, wherein the list does not identify which of the one or more content storing devices of the first home network stores the content.

23. The system of claim 19, wherein the operations further comprise:

transmitting a discovery request from the first home network manager device to the one or more content rendering devices and the one or more content storing devices of the first home network; and receiving, from the one or more content rendering devices and the one or more content storing devices, and based on the discovery request, data identifying the content and identifying, and listing capabilities of, the one or more content rendering devices and the one or more content storage devices.

24. A non-transitory computer-readable medium encoded with a computer program comprising instructions that, when executed, operate to cause a computer to perform operations comprising:

receiving, by a home network community server, first policy information and second policy information from a first home network manager device and second home network manager device, respectively, wherein:

the first home network device manager and the second home network device manager manage a first home network and a second home network, respectively;

the first home network and the second home network each include one or more content rendering devices and one or more content storing devices;

the home network community server serves as an intermediary between the first home network and the second home network; and the first policy information and the second policy information identify users who are authorized to access the first home network and the second home network, respectively;

receiving, by the home network community server, a first presence table from the first home network manager device, wherein the first presence table indexes all content stored on the first home network;

receiving, by the home network community server, a second presence table from the second home network manager device, wherein the second presence table indexes all content stored on the second home network;

receiving, by the home network community server and from a device operated by a user from outside of a physical proximity of the first home network and the second home network, a message from the user requesting that particular content be provided from the first home network to a particular content rendering device or a particular content storing device of the second home network;

determining, by the home network community server and based on the first presence table, that the particular content is stored on the first home network;

determining, by the home network community server and based on the first policy information, that the user is authorized to access the particular content on the first home network;

determining, by the home network community server and based on the second policy information, that the user is authorized to access the particular content rendering device or the particular content storing device of the second home network; and providing, by the home network community server, the particular content from the first home network to the particular content rendering device or the particular content storing device of the second home network based on determining that: (i) the particular content is stored on the first home network, (ii) the user is authorized to access the particular content, and (ii) the user is authorized to access the particular content rendering device or the particular content storing device of the second home network.

25. The computer-readable medium of claim 24, wherein, for each of the first home network and the second home network:

the first presence table further identifies, and lists capabilities of the one or more content rendering devices of the first home network and the one or more content storing devices of the first home network, the second presence table further identifies, and lists capabilities of the one or more content rendering devices of the second home network and the one or more content storing devices of the second home network, the first policy information further lists a level of authorization of the users who are authorized to access the first home network, and the second policy information further lists a level of authorization of the users who are authorized to access the second home network.

26. The computer-readable medium of claim 24, wherein the operations further comprise:

performing, using a query term received from the user, both a local query of the first presence table of the first home network, and an online query of an online database; and providing a search results page to the user, the search results page comprising:

a local results region identifying the content stored on the first home network which satisfies the query term, and an online results region identifying content stored in the online database which satisfies the query, and which is not stored on the first home network.

27. The computer-readable medium of claim 24, wherein the operations further comprise:

providing a list to the user identifying (i) the one or more content rendering devices and content storing devices of the first home network that the user is authorized to access, and (ii) all of the content stored on the first home network, wherein the list does not identify which of the one or more content storing devices of the first home network stores the content.

28. The computer-readable medium of claim 24, wherein the operations further comprise:

transmitting a discovery request from the first home network manager device to the one or more content rendering devices and the one or more content storing devices of the first home network; and receiving, from the one or more content rendering devices and the one or more content storing devices, and based on the discovery request, data identifying the content and identifying, and listing capabilities of, the one or more content rendering devices and the one or more content storage devices.

* * * * *

UNITED STATES PATENT AND TRADEMARK OFFICE
CERTIFICATE OF CORRECTION

| | | |
|---|---|---|
| PATENT NO. | : 8,667,152 B2 | Page 1 of 1 |
| APPLICATION NO. | : 12/428605 | |
| DATED | : March 4, 2014 | |
| INVENTOR(S) | : Giuseppe Capuozzo et al. | |

It is certified that error appears in the above-identified patent and that said Letters Patent is hereby corrected as shown below:

In the Claims

In claim 1, column 22, line 41, delete "(ii)" and insert -- (iii) --, therefor.

Signed and Sealed this
Twenty-fourth Day of June, 2014

Michelle K. Lee
*Deputy Director of the United States Patent and Trademark Office*